United States Patent
Stabon et al.

(10) Patent No.: US 11,180,887 B2
(45) Date of Patent: Nov. 23, 2021

(54) LAUNDRY WASHING MACHINE WITH WATER SOFTENING SYSTEM AND METHOD FOR CONTROLLING A LAUNDRY WASHING MACHINE

(71) Applicant: Electrolux Appliances Aktiebolag, Stockholm (SE)

(72) Inventors: Elisa Stabon, Gorizia (IT); Andrea Zattin, Solesino (IT)

(73) Assignee: ELECTROLUX APPLIANCES AKTIEBOLAG, Stockholm (SE)

( * ) Notice: Subject to any disclaimer, the term of this patent is extended or adjusted under 35 U.S.C. 154(b) by 390 days.

(21) Appl. No.: 15/108,815

(22) PCT Filed: Dec. 30, 2013

(86) PCT No.: PCT/EP2013/078134
§ 371 (c)(1),
(2) Date: Jun. 29, 2016

(87) PCT Pub. No.: WO2015/101390
PCT Pub. Date: Jul. 9, 2015

(65) Prior Publication Data
US 2016/0326681 A1    Nov. 10, 2016

(51) Int. Cl.
*D06F 39/00* (2020.01)
*D06F 39/02* (2006.01)
(Continued)

(52) U.S. Cl.
CPC ............ *D06F 39/02* (2013.01); *C02F 1/42* (2013.01); *D06F 33/44* (2020.02); *D06F 37/04* (2013.01);
(Continued)

(58) Field of Classification Search
CPC .. D06F 39/005; D06F 39/007; D06F 2103/20; A47L 15/4229; A47L 2301/04;
(Continued)

(56) References Cited

U.S. PATENT DOCUMENTS 5,167,722 A    12/1992    Pastryk et al.
5,272,892 A    12/1993    Janutka et al.
(Continued)

FOREIGN PATENT DOCUMENTS

CH    704603 A2    7/2012
DE    3519831 A1    12/1986
(Continued)

OTHER PUBLICATIONS

DE19940162—Machine Translation (Year: 2001).*
(Continued)

*Primary Examiner* — Marc Lorenzi
(74) *Attorney, Agent, or Firm* — RatnerPrestia

(57) ABSTRACT

Laundry washing machine (1) has an outer casing (2), a washing tub (3), arranged inside the casing (2), a rotatable drum (4), arranged in axially rotating manner inside the washing tub (3) and is designed to receive laundry to be washed. The machine further has a detergent dispensing assembly (12), designed for supplying laundry detergent into the washing tub (3), a water softening system (14), designed to receive fresh water from a water mains (13) and reduce the hardness degree of the fresh water in order to supply softened water to the detergent dispensing assembly (12) and/or to the washing tub (3), during one or more softened water laundry washing phases. The machine further has a control panel (28) configured to allow operator to input information associated with a laundry washing course having one or more softened water laundry washing phase/s; and a controller (15) configured to determine a time saving (Continued)

| washing course / User selection | Main Wash phase | Secondary laundry wash phases | | | | | tSi | ΔtSi |
|---|---|---|---|---|---|---|---|---|
| | | First Rinse | Second Rinse | .... Rinse | .... Rinse | Last Rinse | | |
| TIME saving washing course A | Soft. Water | Fresh Water | Fresh Water | Fresh Water | Fresh Water | Fresh Water | tS1 | ΔtS1 |
| TIME saving washing course B | Soft. Water | Mix. Water | Fresh Water | Fresh Water | Fresh Water | Fresh Water | tS2 | ΔtS2 |
| TIME saving washing course C | Soft. Water | Mix. Water | Mix. Water | Fresh Water | Fresh Water | Fresh Water | tS3 | ΔtS3 |
| TIME saving washing course D | Soft. Water | Mix. Water | Mix. Water | Mix. Water | Fresh Water | Fresh Water | tS4 | ΔtS4 |
| | | | | | | | | |
| TIME saving washing course N-1 | Soft. Water | Soft. Water | Soft. Water | Soft. Water | Soft. Water | Mix. Water | tSN-1 | ΔtSN-1 |
| TIME saving washing course N | Soft. Water | Soft. Water | Soft. Water | Soft. Water | Soft. Water | Soft. Water | tSN | ΔtSN | value (tSi) of one or more laundry washing phases of the washing courses to be performed, based on the softened water laundry washing phase/s of said laundry washing course.

17 Claims, 6 Drawing Sheets

(51) Int. Cl.
```
D06F 37/04      (2006.01)
C02F 1/42       (2006.01)
G05B 19/409     (2006.01)
G05B 19/10      (2006.01)
D06F 33/44      (2020.01)
C02F 103/00     (2006.01)
D06F 34/28      (2020.01)
D06F 103/20     (2020.01)
D06F 105/02     (2020.01)
D06F 105/56     (2020.01)
D06F 101/00     (2020.01)
```
(52) U.S. Cl.
CPC ......... *D06F 39/007* (2013.01); *G05B 19/106* (2013.01); *G05B 19/409* (2013.01); *C02F 2103/002* (2013.01); *C02F 2209/055* (2013.01); *C02F 2303/22* (2013.01); *C02F 2307/12* (2013.01); *D06F 34/28* (2020.02); *D06F 2101/00* (2020.02); *D06F 2103/20* (2020.02); *D06F 2105/02* (2020.02); *D06F 2105/56* (2020.02); *G05B 2219/2633* (2013.01)

(58) Field of Classification Search
CPC ............. A47L 2401/03; A47L 2401/11; A47L 2501/18
See application file for complete search history.

(56) References Cited

U.S. PATENT DOCUMENTS

| | | | |
|---|---|---|---|
| 6,169,964 B1 | 1/2001 | Aisa et al. | |
| 6,557,382 B1 * | 5/2003 | Koike | D06F 39/007 68/13 A |
| 2005/0103631 A1 * | 5/2005 | Freydina | B01D 61/48 204/533 |
| 2005/0252538 A1 | 11/2005 | Vernon et al. | |
| 2007/0028397 A1 | 2/2007 | Park et al. | |
| 2008/0000272 A1 | 1/2008 | Park et al. | |
| 2009/0114598 A1 | 5/2009 | van Kralingen et al. | |
| 2010/0287709 A1 | 11/2010 | Doyle et al. | |
| 2010/0287711 A1 * | 11/2010 | Geyer | D06F 34/28 8/137 |
| 2012/0174631 A1 * | 7/2012 | Cho | D06F 37/304 68/12.23 |
| 2012/0180227 A1 | 7/2012 | Kim et al. | |
| 2012/0203391 A1 | 8/2012 | Lee | |
| 2013/0263387 A1 | 10/2013 | Aykroyd et al. | |
| 2015/0368848 A1 | 12/2015 | Del Pos et al. | |
| 2016/0312396 A1 * | 10/2016 | Cruickshank | D06F 33/00 |

FOREIGN PATENT DOCUMENTS

| | | | |
|---|---|---|---|
| DE | 19940162 A1 | 3/2001 | |
| DE | 102005049078 A1 | 4/2007 | |
| DE | 102010028445 A1 | 11/2011 | |
| DE | 102013206359 A1 | 10/2014 | |
| EP | 0425815 A2 * | 5/1991 | ......... A47L 15/4229 |
| EP | 0467028 A1 | 1/1992 | |
| EP | 0749720 A1 | 12/1996 | |
| EP | 0861114 A1 | 9/1998 | |
| EP | 1085118 A2 | 3/2001 | |
| EP | 2565319 A1 | 3/2013 | |
| EP | 2657387 A1 | 10/2013 | |
| EP | 2486180 B1 * | 6/2018 | |
| GB | 1442616 A | 7/1976 | |
| JP | 2001017775 A | 1/2001 | |
| WO | 2006079417 A1 | 8/2006 | |
| WO | 2007108645 A1 | 9/2007 | |
| WO | 2009066940 A2 | 5/2009 | |
| WO | 2011042341 A1 | 4/2011 | |
| WO | 2011080241 A1 | 7/2011 | |

OTHER PUBLICATIONS

Non Final Office Action for U.S. Appl. No. 15/108,816, dated Jul. 2, 2018, 21 pages.
Final Office Action for U.S. Appl. No. 15/108,816, dated Oct. 11, 2018, 17 pages.
International Search Report in corresponding International Application No. PCT/EP2014/064414 dated Sep. 17, 2014.
International Search Report in corresponding International Application No. PCT/EP2014/064413 dated Sep. 17, 2014.
International Search Report in corresponding International Application No. PCT/EP2013/078133 dated Mar. 25, 2014.
International Search Report in related International Application No. PCT/EP2013/078135, dated Oct. 6, 2014.
International Search Report issued in related International Application No. PCT/EP2013/078134, dated Jul. 28, 2014.
Non Final Office Action for U.S. Appl. No. 15/108,895, dated Nov. 28, 2018, 15 pages.
Notice of Allowance for U.S. Appl. No. 15/108,816, dated Jul. 17, 2019, 14 pages.
Non Final Office Action for U.S. Appl. No. 15/108,816, dated Feb. 21, 2019, 17 pages.
Non Final Office Action for U.S. Appl. No. 15/108,814, dated Jun. 14, 2019, 11 pages.
Non Final Office Action for U.S. Appl. No. 15/108,985, dated Jun. 14, 2019, 9 pages.
Notice of Allowance for U.S. Appl. No. 15/108,895, dated Jun. 4, 2019, 7 pages.
Final Office Action for U.S. Appl. No. 15/108,895, dated Mar. 21, 2019, 7 pages.
Australian Examination Report for Australian Application No. 2013409579, dated Feb. 4, 2019, 4 pages.
Notice of Allowance for U.S. Appl. No. 15/108,814, dated Oct. 4, 2019, 17 pages.
Notice of Allowance for U.S. Appl. No. 15/108,985, dated Oct. 9, 2019, 10 pages.

* cited by examiner

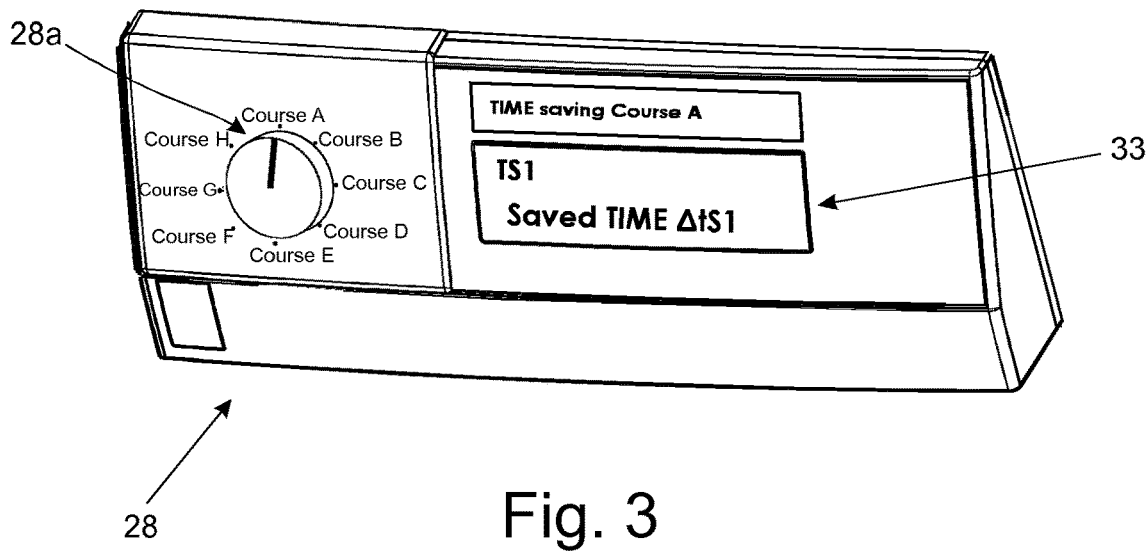

Fig. 3

| washing course User selection | Main Wash phase | Secondary laundry wash phases ||||| tSi | ΔtSi |
| --- | --- | --- | --- | --- | --- | --- | --- | --- |
| | | First Rinse | Second Rinse | .... Rinse | .... Rinse | Last Rinse | | |
| TIME saving washing course A | Soft. Water | Fresh Water | Fresh Water | Fresh Water | Fresh Water | Fresh Water | tS1 | ΔtS1 |
| TIME saving washing course B | Soft. Water | Mix. Water | Fresh Water | Fresh Water | Fresh Water | Fresh Water | tS2 | ΔtS2 |
| TIME saving washing course C | Soft. Water | Mix. Water | Mix. Water | Fresh Water | Fresh Water | Fresh Water | tS3 | ΔtS3 |
| TIME saving washing course D | Soft. Water | Mix. Water | Mix. Water | Mix. Water | Fresh Water | Fresh Water | tS4 | ΔtS4 |
| | | | | | | | | |
| TIME saving washing course N-1 | Soft. Water | Soft. Water | Soft. Water | Soft. Water | Soft. Water | Mix. Water | tSN-1 | ΔtSN-1 |
| TIME saving washing course N | Soft. Water | Soft. Water | Soft. Water | Soft. Water | Soft. Water | Soft. Water | tSN | ΔtSN |

Fig. 4

LAUNDRY WASHING MACHINE WITH WATER SOFTENING SYSTEM AND METHOD FOR CONTROLLING A LAUNDRY WASHING MACHINE

FIELD

In particular, the present invention refers to a laundry washing machine and a method for controlling a laundry washing machine provided with a water softener system.

More particularly, to a front-loading home laundry washing machine designed to perform time saving functions and a control method thereof, to which the following description refers purely by way of example without this implying any loss of generality.

BACKGROUND

Nowadays the use of laundry treatment appliances, such as laundry washing machines, i.e. laundry washing machines which wash and rinse laundry, or laundry washing and drying machines, i.e. laundry washing machines which can also dry laundry, is widespread. In this respect, in the present description, where not stated differently, the term "laundry washing machine" can be referred to a laundry washing machine, or a laundry washing and drying machines.

Laundry washing machines generally comprise an external casing provided with a washing tub which comprises a rotatable perforated drum where the laundry is placed, an electric motor which rotates the drum in the washing tub, a water-detergent supplying system, which supplies fresh water and detergent into the washing tub/drum, and a water draining system which discharges/drains wash water/detergent from the washing tub.

Laundry washing machines further comprise a control panel provided for a user to select a laundry washing course to be performed, such as cotton, delicates, wool, silk etc. and a controller configured to control several operating devices/apparatus of the laundry washing machine so as to perform the laundry washing phases based on the selected laundry washing course.

The Applicant conducted an in-depth study with the objective of providing a laundry washing machine which is designed to reduce the duration of a laundry washing courses compared with corresponding known standard laundry washing courses, without however affecting the laundry washing performances.

It is thus the object of the present invention to provide a solution which allows achieving the objective indicated above.

SUMMARY OF SELECTED INVENTIVE ASPECTS

According to aspects of the present invention, there is provided a laundry washing machine comprising an outer casing, a washing tub, which is arranged inside the casing, a rotatable drum, which is arranged in axially rotating manner inside the washing tub and is designed to receive laundry to be washed, a detergent dispensing assembly, which is designed for supplying laundry detergent into the washing tub, a water softening system, which is designed to receive fresh water from a water mains and reduce the hardness degree of the fresh water in order to supply softened water the detergent dispensing assembly and/or to the washing tub, during one or more softened water laundry washing phases; a control panel configured to allow operator to input information associated with a laundry washing course comprising one or more softened water laundry washing phase/s; and a controller configured to determine a time saving value associated with the duration of one or more laundry washing phases of the washing courses to be performed, based on the softened water laundry washing phase/s of said laundry washing course.

Preferably, laundry washing course further comprises one or more fresh water laundry washing phase/s, wherein fresh water is supplied to detergent dispensing assembly and/or to the washing tub; said controller being configured to determine said time saving value based on the softened water laundry washing phase/s and the fresh water laundry washing phase/s of the laundry washing course to be performed.

Preferably, laundry washing course further comprises one or more mix water laundry washing phase/s, wherein a mixture of fresh water and softened is supplied to detergent dispensing assembly and/or to the washing tub; said controller being configured to determine said time saving value based on the softened water laundry washing phase/s and the mix water laundry washing phase/s of the laundry washing course to be performed.

Preferably, said controller is further configured to determine said time saving value based on the softened water laundry washing phase/s, the mix water laundry washing phase/s and the fresh water laundry washing phase/s of the laundry washing course to be performed.

Preferably, said washing course comprises a main laundry wash phase and one or more secondary laundry wash phases following the main laundry wash phase; said main laundry wash phase comprises at least a wetting phase, a maintenance phase and a drain phase; said secondary laundry wash phases comprising one or more rinse phases which start after the end of said drain phase of the main laundry wash phase.

Preferably, the main laundry wash phase comprises: a wetting phase (step of loading water and detergent into the washing tub), a maintenance phase (step of tumbling the laundry for detergent action), a drain phase (step of draining water), and preferably, although not necessarily, a spin phase (step of spinning the drum).

Preferably, if the course to be performed uses heated water, the main laundry wash phase can further comprise a heating phase (step of switching-on the heating device 11) which is performed after the wetting phase and preferably before the maintenance phase.

Preferably, the drain phase is the last phase of the main laundry wash phase, and is performed before executing the first rinse phase of the secondary laundry wash phases following the main laundry wash phase.

Preferably, the rinse phases following the main laundry wash phase, may comprise a water loading phase (loading water into the washing tub), a rinse maintenance phase (tumbling the laundry), a drain phase, and preferably a spin phase.

Preferably, said control panel is configured to allow operator to select a time course among one or more predetermined time saving washing courses, wherein each time saving washing course comprises one or more softened water laundry washing phase/s.

Preferably, memory means contains data relating to one or more time saving washing courses, said memorized data being indicative of loading of softened water, or fresh water, or mix water to the detergent dispensing assembly and/or the washing tub during laundry washing phases of time saving washing courses, and being associated with a time saving value; said controller being configured to: selectively activate said water softening system based on said selected time saving washing course in order to supply softened water to the detergent dispensing assembly and/or the washing tub during at least said main laundry wash phase, and determine said time saving value in response of said selected detergent saving washing course.

Preferably, said control panel comprises: a first select part configured to allow operator to input first information indicative of a laundry washing course; a second select part configured to allow operator to input second information indicative of one or more time saving commands; said controller being configured to determine/set the time saving washing course based on received first and second information; said time saving washing course comprises one or more softened water laundry washing phase/s.

Preferably, said first select part is configured to allow operator to select a laundry washing course among one or more predetermined fresh water laundry washing courses, a fresh water laundry washing course comprising only fresh water washing phases, and being associated with a prefixed time; said second select part being configured to allow operator to input said second information indicative of one or more time saving commands associated with respective time saving levels; said controller being further configured to set the time saving laundry washing course based on the selected fresh water laundry washing course and said time saving commands, and determine the time saving value by reducing said prefixed time on the basis on said time saving commands.

Preferably, said controller is further configured to set the time saving laundry washing course by replacing one or more fresh water washing phases of the fresh water washing course with respective softened water washing phases ad/or mix water laundry washing phases, based on said time saving commands; and control said water softening system in response to the softened water washing phase/s of the set time saving laundry washing course to supply softened water during at least the main laundry wash phase and/or during one or more of the secondary laundry wash phase/s.

Preferably, said first select part is configured to allow operator to select a water laundry washing course among one or more softened water laundry washing courses, a softened water laundry washing course comprising one or more softened water laundry washing phase/s and being associated with a prefixed time; said second select part being configured to allow operator to input said second information indicative of at least one time saving command; said controller being configured to determine said time saving amount by reducing said prefixed time on the basis on said time saving command.

Preferably, said control panel is configured to provide operator with at least one of the following: an indication of said preset time; an indication of the time saving value; an indication of the difference between said preset time and said time saving value.

Preferably, softened water has a reduced hardness degree which is lower than about 15 FH.

Preferably, softened water has a reduced hardness degree which is lower or equal than about 5 FH.

Preferably, softened water has a reduced hardness degree which is lower or equal than about 2 FH.

Preferably, softened water has a reduced hardness degree which is lower or equal than about 1 FH.

Preferably, mix water has a reduced hardness degree which is greater than, or equal to about 15 FH, and lower than, or equal to about 25 FH.

Preferably, main laundry wash phase comprises a softened water laundry wash phase; each secondary laundry wash phase comprises: a softened water laundry wash phase or a fresh water laundry wash phase or a mix water laundry wash phase.

Preferably, said water softening system comprises a water-softening agent container, which is filled with a given amount of ion-exchange resins capable to restrain the calcium and/or magnesium ions dissolved in the fresh water flowing across the water-softening agent container, and a regeneration-agent reservoir which is structured for receiving a given amount of salt grains and is designed to uses brine to periodically regenerate said ion-exchange resins contained in said water-softening agent container.

Preferably, an electrically-powered brine-circulating pump is interposed between the water-softening agent container and the regeneration-agent reservoir and is structured for transferring/moving the brine (i.e. the salt water) from the regeneration-agent reservoir to the water-softening agent container when activated.

Preferably, water softening system comprises at least a flow through capacitor comprising plates having a conductive surface, wherein the plates are chargeable in response to an applied voltage to remove ions dissolved in the fresh water.

Preferably, the controller is configured to control the wetting step, and/or the maintenance phase, and/or the heating phase, in such a way to cause the main wash phase to end within said time saving value.

Preferably, the controller is configured to control the maintenance phase in such a way to cause the main wash phase to end within said time saving value (tSi).

Preferably, the controller controls the rotation of drum in such a way to cause the maintenance phase to end within the determined time saving value tSi.

Preferably, the machine comprises electronic sensing means configured to determine the hardness degree of the water supplied into the washing tub; controller being configured to regulate the time saving value based on said determined hardness degree.

Preferably, controller is configured to control said water softening system in order to regulate the hardness degree of the softened water based on the determined hardness degree.

Aspects of the present invention further relate to a method for controlling a laundry washing machine comprising: an outer casing, a washing tub, which is arranged inside the casing, a rotatable drum, which is arranged in axially rotating manner inside the washing tub and is designed to receive laundry to be washed, a detergent dispensing assembly, which is designed for supplying laundry detergent into the washing tub, a water softening system, which is designed to receive fresh water from a water mains and reduce the hardness degree of the fresh water in order to supply softened water the detergent dispensing assembly and/or to the washing tub, during one or more softened water laundry washing phases; a control panel configured to allow operator to input information associated with a laundry washing course comprising one or more softened water laundry washing phase/s; the method being characterizing in comprising the steps of determine a time saving value of one or more laundry washing phases of the washing courses to be performed, based on the softened water laundry washing phase/s of said laundry washing course.

BRIEF DESCRIPTION OF THE DRAWINGS

Further characteristics and advantages of the present invention will be highlighted in greater detail in the following detailed description of some of its preferred embodiments, provided with reference to the enclosed drawings. In the drawings, corresponding characteristics and/or components are identified by the same reference numbers. In particular:

FIG. 3 schematically illustrates a first embodiment of a user control panel of the laundry washing machine illustrated in FIG. 1;

FIG. 4 shows an example of a table containing time saving washing courses selectable by the control panel illustrated in FIG. 3;

DETAILED DESCRIPTION OF EXAMPLE EMBODIMENTS

Aspects of the present invention have proved to be particularly advantageous when applied to a laundry treatment machine, such as laundry washing machines, as described below. It should be understood that although the present invention is described with reference to a laundry washing machine, other applications are contemplated. As can be appreciated, aspects of the present invention can be conveniently applied to other laundry treatment appliances, like for example laundry washing and drying machines (called also washer/driers), wherein one or more steps of introducing water and/or steam and/or hot/cool air inside a laundry tub may be required.

Figure 1:
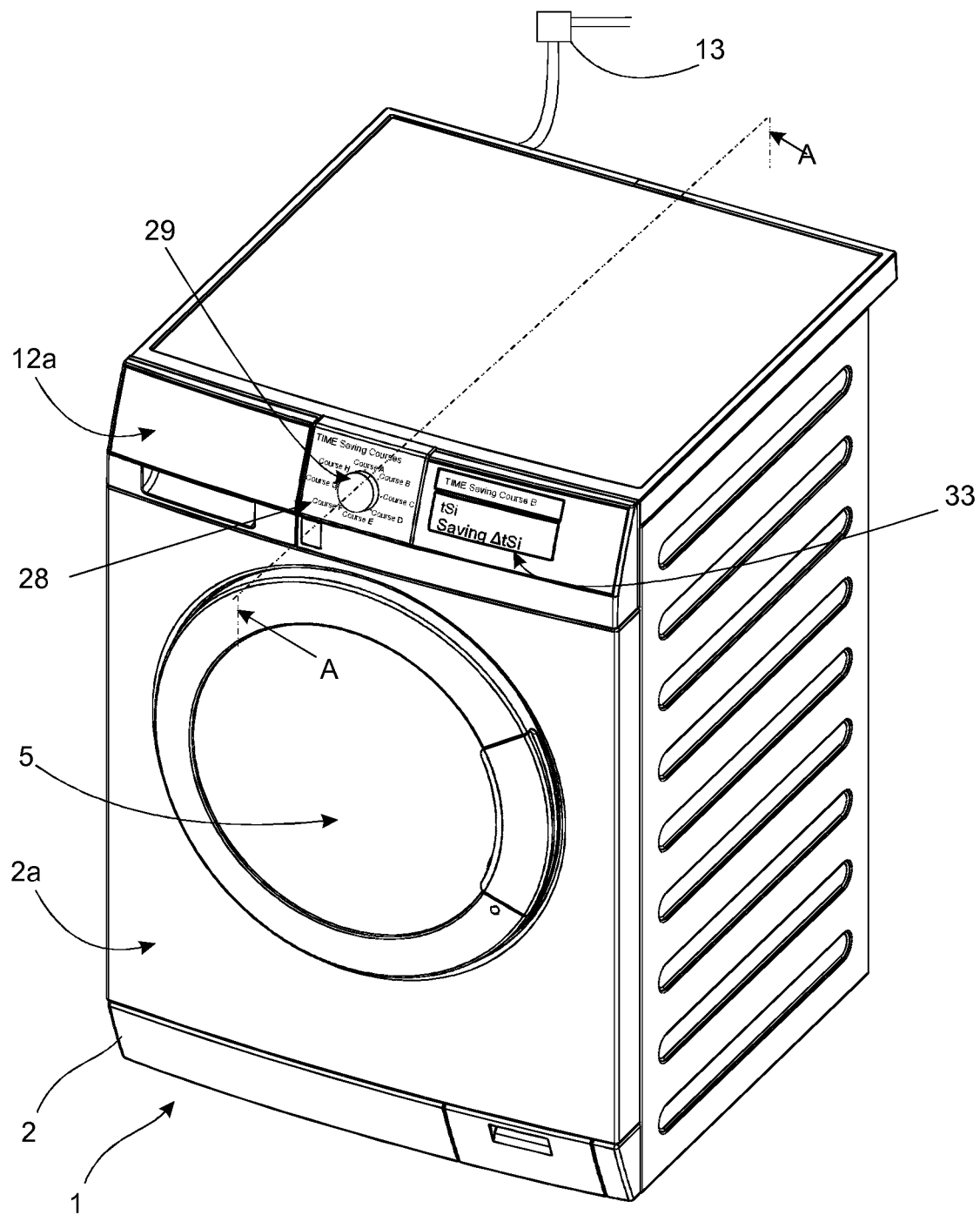
FIG. 1 is a schematic perspective view of a laundry washing machine according to aspects of the present invention.
Figure 2:
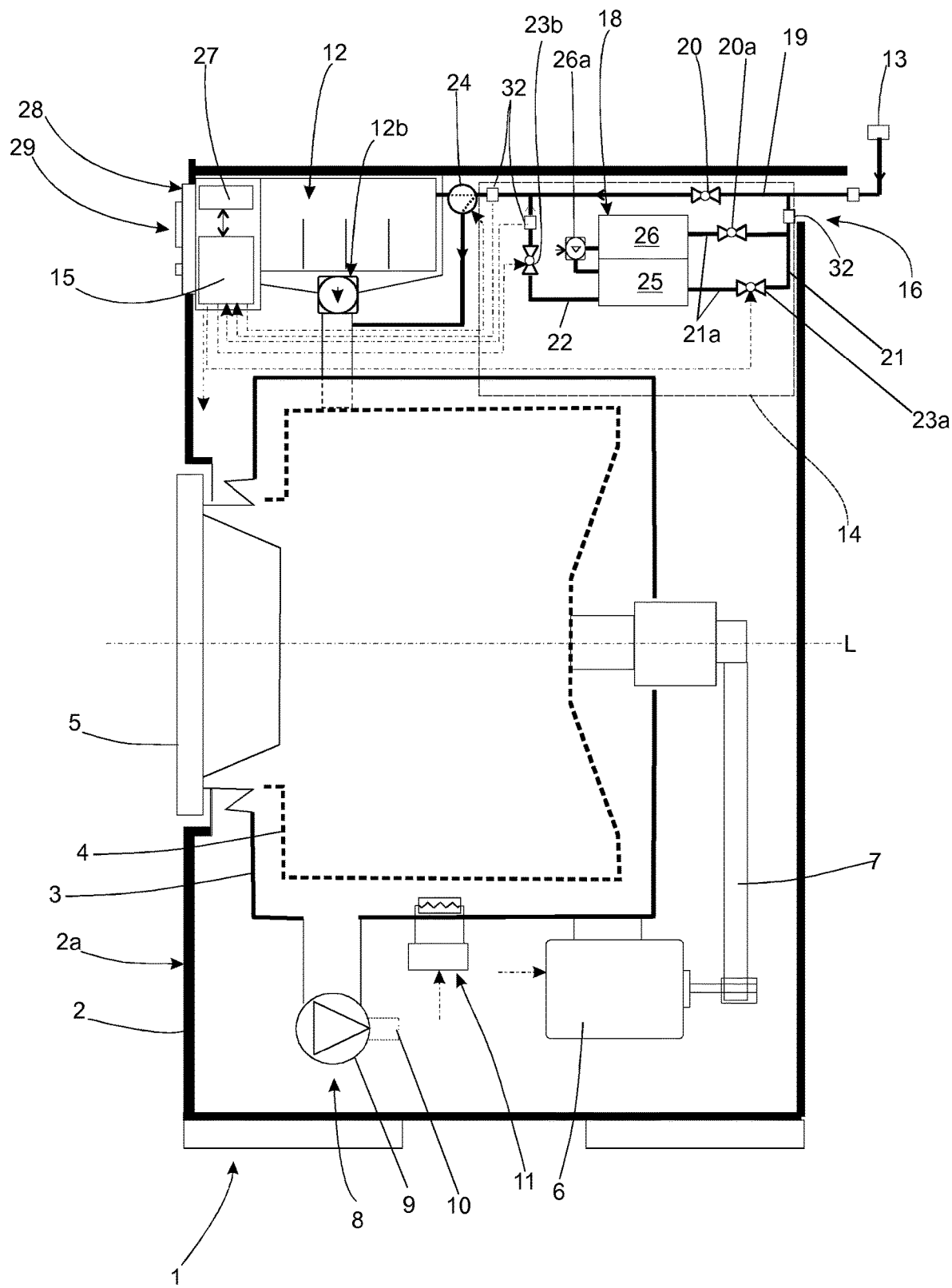
FIG. 2 is a longitudinal cross-sectional schematic view taken along line A-A in FIG. 1, with some parts/components of the machine removed for clarity.

With reference to FIGS. 1 and 2, reference number 1 indicates as a whole a home laundry washing machine which comprises: a preferably, though not necessarily, substantially parallelepiped-shaped, rigid outer boxlike casing 2, which is structured for resting on the floor; a preferably substantially cylindrical, bell-shaped hollow washing tub 3, which is arranged inside the casing 2 with its opening or mouth directly facing a laundry loading/unloading passthrough opening realized in the front wall 2a of boxlike casing 2; a preferably substantially cylindrical, elastically-deformable bellows (not shown) watertight connecting the front opening or mouth of washing tub 3 to the laundry loading/unloading opening realized in the front wall 2a of casing 2; and a substantially cylindrical, bell-shaped revolving perforated drum 4 structured for housing the laundry to be washed, and which is housed in axially rotating manner inside the washing tub 3 so as to be able to freely rotate about its longitudinal reference axis.

According to one embodiment, the revolving drum 4 is housed in axially rotating manner inside the washing tub 3 with its front opening directly faced/aligned to the laundry loading/unloading opening on the front wall 2a of casing 2, and the drum rotation axis is preferably arranged locally substantially coincident with the substantially horizontally-oriented longitudinal reference axis of washing tub 3. In an alternative embodiment not shown, rotation axis may be vertical or inclined.

Furthermore in the example shown, the hollow washing tub 3 is preferably suspended in floating manner inside the casing 2 via a suspension system preferably, though not necessarily, comprising a couple of upper coil springs (non illustrated) connecting the upper portion of the washing tub 3 to the top of the boxlike casing 2, and a couple of lower vibration dampers (not illustrated) connecting the bottom portion of the washing tub 3 to the bottom of the boxlike casing 2.

With reference to FIG. 1, the laundry washing machine 1 furthermore comprises a porthole door 5 which is hinged to the front wall 2a of casing 2 to rotate about a preferably, though not necessarily, vertically-oriented reference axis to and from a closing position in which the peripheral border of the porthole door 5 rests completely on front wall for closing the laundry loading/unloading opening and water-tight sealing the washing tub 3; and an electrically-powered motor assembly 6 which is structured for driving into rotation the revolving drum 4 about its longitudinal reference axis inside the washing tub 3, by means of a belt/pulley system 7. In a different embodiment of the invention, the motor 6 may be directly associated with the shaft of the revolving drum 4.

With reference to FIG. 2, the laundry washing machine 1 furthermore comprises a water draining system 8 (only partially and schematically illustrated), which is configured to drain the wash water, i.e. dirty water and/or water mixed with washing and/or rinsing products, from the washing tub 3 to the outside. The water draining system 8 may comprise a draining pump 9 (schematically illustrated in FIG. 2), which is fluidly connected to a liquid outlet arranged on the bottom region of the washing tub 3 and is configured to drain the water from the washing tub 3 to supply the drained water into a draining suction pipe 10 (only partially illustrated in broken lines in FIG. 2).

As shown in FIG. 2, the laundry washing machine 1 furthermore comprises a detergent dispensing assembly 12, which is housed inside the casing 2 in easily reachable manner by the user, and is structured for supplying into the washing tub 3, detergent preferably mixed with water. In one exemplary embodiment, the detergent dispensing assembly 12 may comprise a detergent drawer 12a (illustrated in FIG. 1) which may be fitted/inserted in manually extractable manner into a completely recessed drawer housing (not illustrated), which extends substantially horizontally inside the boxlike casing 2, and is manually movable inside the drawer housing between a working position (illustrated in FIG. 1) and an extracted position (not illustrated). It should be understood that detergent dispensing assembly 12 may be structured for selectively spilling/pouring a given amount of fresh water arriving from a fresh water mains 13 directly into the detergent drawer 12a, so as to flush the detergent, out of the same detergent drawer 12a so that detergent mixed with water is loaded into the washing tub 3.

According to an embodiment the detergent dispensing assembly 12 comprises a single-dose structure which is configured to supply into the washing tub 3 water mixed with a dosage of detergent previously loaded by the user into the detergent drawer 12*a*.

However, it should be understood that according to a different embodiment, the detergent dispensing assembly 12 may have an auto-dosing structure. I.e. it is provided with an auto-dosing detergent device 12*b* designed to automatically control the amount of detergent supplied into the washing tub 3. The auto-dosing detergent device 12*a* may comprise, for example, one or more detergent metering pumps (not illustrated), i.e. volumetric pumps for the metered feed of the detergent mixed with water into the washing tub 3 based on control signals.

As shown in FIG. 2, the laundry washing machine 1 may preferably, although not necessarily, comprise a heating device 11 configured to heat the water solution loaded in the washing tub 4 to a determined temperature. In this instance, the washing tub 3, the drum 4, the suspension system, the electrically-powered motor assembly 6, the heating device 11, and the water draining system 8 of the laundry washing machine 1 are well-known elements provided in well-known laundry machine and detailed description thereof will be omitted accordingly.

Terminology which will be used as follows is hereinafter defined.

More specifically, "FH" is the unit of measurement of water hardness degree corresponding to French degree, wherein 1 fH=10 ppm CaCo3.

With the term fresh water, it will be understood a tap water provided by a water mains 13 usually arranged in a house. It should be understood that water mains 13 generally provides "hard water", i.e. water having a hardness degree greater than about 25 FH (250 ppm CaCo3).

With the term "softened water", it will be understood a water provided by a water softener system which will be disclosed in detail afterwards. In order to be effective for washing process the softened water may have an hardness degree lower than about 15 FH (150 ppm CaCo3), preferably lower than 5 FH (50 ppm CaCo3) and more preferably lower than 2 FH (20 ppm CaCo3).

More preferably, according to a preferred embodiment, softened water may have a hardness degree lower than about 1 FH (10 ppm CaCo3).

With the term mix water, it will be understood a mixture of fresh water and softened water. Preferably, hardness degree of mix water may be comprised between about 15 and about 25 FH.

With "washing course", it will be understood a laundry washing cycle/program comprising a "main laundry wash phase", and one or more "secondary laundry wash phases" following the main laundry wash phase, wherein the secondary laundry wash phases may comprise one or more laundry rinse phase and preferably, although not necessarily, at least one laundry spin phase.

The main laundry wash phase comprises: a wetting phase (step of loading water and detergent into the washing tub), a maintenance phase (step of tumbling the laundry for detergent action), a drain phase (step of draining water), and preferably, although not necessarily, a spin phase (step of spinning the drum).

If the course to be performed uses heated water, the main laundry wash phase can further comprise a heating phase (step of switching-on the heating device 11) which is performed after the wetting phase and preferably before the maintenance phase.

It should be pointed out that drain phase is the last phase of the main laundry wash phase, and is performed before executing the first rinse phase of the secondary laundry wash phases following the main laundry wash phase.

Rinse phases following the main laundry wash phase, may comprise a water loading phase (loading water into the washing tub), a rinse maintenance phase (tumbling the laundry), a drain phase, and preferably a spin phase.

With "softened water laundry wash phase", it will be understood a laundry wash phase wherein softened water is supplied into the washing tub 3.

With "fresh water laundry wash phase", it will be understood a laundry wash phase wherein fresh water is supplied into the washing tub 3.

With "mix water laundry wash phase", it will be understood a laundry wash phase wherein mix water is supplied into the washing tub 3.

With "fresh water laundry washing course", it will be understood a laundry washing course wherein all the wash phases comprise the step of supplying fresh water into the washing tub 3.

With "softened water laundry washing course", it will be understood a laundry washing course wherein the main wash phase comprises the step of supplying softened water, and the laundry wash phases following the main wash phase comprise the step of supplying softened or mix or fresh water.

With the term "time saving washing course", it will be understood a laundry washing course comprising supplying softened water during the "main wash phase" and preferably during one or more of the secondary laundry washing phases following the main laundry wash phase, wherein the actual laundry wash duration of the main wash phase is reduced to an optimized wash duration $tSi$ which is lower than a predetermined washing duration $tNi$, based on the softened water washing phase/s. It should be understood that the predetermined wash duration may correspond to the duration of the main wash of a "standard fresh water washing course" having similar washing features of the selected time saving washing course, (such as for example, same washing temperature, same amount of detergent, same kind of laundry to wash, same laundry weight, etc.).

With the term "detergent", it will be understood any kind of laundry cleansing-agent which is supplied into the washing tub 3 during the main wash phase.

The laundry washing machine 1 furthermore comprises a water softener system 14, which is arranged inside the casing 2 between the water mains 13 and the detergent dispensing assembly 12, or between the water mains 13 and directly the washing tub 3, and is designed to reduce the hardness degree of the fresh water so as to provide softened water to the detergent dispensing assembly 12 or directly to the washing tub 3.

According to one simplified embodiment, the water softener system 14 may be structured to be activated/controlled so as to operate between a first operating state, wherein it provide softened water, and a second operating state, wherein it provides fresh water. It should be understood however that other kind of water softener systems may be contemplated. As can be appreciated, aspects of the present invention can be conveniently applied to a water softener system which may be activated/controlled so as to selectively operate, in addition to the first and second operating states above disclosed, further in a third state wherein it provides mix water.

According to a simplified embodiment, the water softener system 14 may be designed to vary the hardness degree of the softened water and/or mix water, based on received control/command signals.

With regard to an exemplary embodiment illustrated in FIG. 2, the water softener system 14 may comprise a fresh water supply circuit 16, which is arranged inside the casing 2 between the water mains 13 and the detergent dispensing assembly 12 or between the water mains 13 and directly the washing tub 3, and may be structured so as to control/regulate the flow of fresh water from the water mains 13 towards the detergent dispensing assembly 12 and/or the washing tub 3. In accordance with the exemplary embodiment illustrated in FIG. 2, the machine 1 may preferably although not necessarily comprise an electric-controlled flow diverter device 24 which is connected between the water softener system 14 and the detergent dispensing assembly 12/the washing tub 3, and is designed to receive fresh or softened or mix water from the water softener system 14 and selectively supply, on command, the received water to the detergent dispensing assembly 12 or the washing tub 3. However, it should be understood that according to different embodiments, the water softener system 14 may comprise any other known device/system designed to selectively supply the received water to the detergent dispensing assembly 12 or the washing tub 3.

In accordance with one embodiment, the water softener system 14 further comprise an internal water softening device 18, which may be arranged along the fresh water supply circuit 16 between the water mains 13 and the detergent dispensing assembly 12, or the flow diverter device 24 if presents, so as to be crossed by the fresh water flowing from the water mains 13 towards the detergent dispensing assembly 12 or directly towards the washing tub 3, and is structured to reduce the hardness degree of the fresh water drawn from the water mains 13 so as to provide the softened water to be channeled to the detergent dispensing assembly 12 or directly to the washing tub 3.

In accordance with one simplified exemplary embodiment shown in FIG. 2, the fresh water supply circuit 16 may preferably comprise a hosepipe 19 connecting the water mains 13 to the inlet of the detergent dispensing assembly 12 or to the washing tub 3, an electrically-controlled valve 20 which is arranged along the hosepipe 19 and is able to control/regulate the flow of fresh water from the water mains 13 towards the detergent dispensing assembly 12 or to the washing tub 3; a hosepipe 21 connecting the water mains 13 to the inlet of water softening device 18 which in turn has the outlet connected to the hosepipe 19 or directly to the detergent dispensing assembly 12 by means of a hosepipe 22; an electrically-controlled valve 23a, which is arranged along the hosepipe 21 and is designed to control/regulate the flow of fresh water from the water mains 13 towards the inlet of the water softening device 18 based on a control signal in order to cause the water softening device 18 to regulate/reduce the hardness degree of the softened water provided in its outlet; and preferably although not necessarily, an electrically-controlled valve 23b, which may be arranged along the hosepipe 22 and is designed to control/regulate the flow of softened water from the water softening device 18 towards the hosepipe 19. It should be understood that mix water may be provided for example by controlling the electrically-controlled valve 20 and 23b.

The electrically-controlled valves 20 and/or 23a and/or 23b may be on-off electric valves configured to be selectively controlled/activated so as to cause the softened, fresh or mix water to be selectively supplied to the detergent dispensing assembly 12/washing tub 3. It should be understood that electrically-controlled valves 20 and/or 23a and/or 23b may be controlled to selectively regulate the volume (liters) of fresh water crossing the hosepipe 19, and/or crossing the softening device 18 and/or the volume of water that the water softening device 18 provides to the hose 19 in order to mix the fresh water and softened water so as to provide mix water having a determined hardness degree.

The electrically-controlled valves 20 and/or 23a and/or 23b could be controlled so that the hardness degree of the softened or mix water is regulated based on a required value. It should in any case be understood that control of the hardness degree of the water may be not limited to the circuit above disclosed. For example the electrically-controlled valve 20, 23a, 23b may be not limited to on-off electric valves but according to possible different embodiments of the present invention, the electrically-controlled valve 20, 23a, 23b may be proportional valve or other kind of known valve electrically designed to be controlled to regulate a water flow rate.

In accordance with one embodiment shown in FIG. 2, the laundry washing machine 1 may preferably, although not necessarily, comprise an electronic sensing system 32, which may comprise one or more sensor devices configured to determine/measure hardness values of the water. Sensor devices may be arranged along the hosepipes 19, 21, 22 to determine/measure hardness values which are indicative of the hardness degree of: the fresh water provided from the water mains 13 and/or the softened water provided in outlet by the water softening device 18, and/or the fresh/softened/mix water provided by the water softener system 14.

In accordance with the exemplary embodiment shown in FIG. 2, the sensor devices may be conductometric sensors arranged along the hosepipes 19, 21, 22 upstream from the detergent dispensing assembly 12.

According to an embodiment shown in FIG. 2, the water softening device 18 may be a ion-removal device type. In accordance with one exemplary embodiment, the water softening device 18 may comprise a water-softening agent container 25, which is filled with a given amount of ion-exchange resins (not shown) capable to restrain the calcium and/or magnesium ions (Ca++ an Mg++) dissolved in the fresh water flowing across the water-softening agent container 25 and is preferably interposed between the hosepipes 21 and 22 to be crossed by the fresh water flowing from the valve 23a and the hosepipe 21. In accordance with one exemplary embodiment, the water softening device 18 may further comprise a regeneration-agent reservoir 26 which to structured for receiving a given amount (for example half a Kilo or one Kilo) of salt grains (Sodium Chloride) and is designed to uses brine (i.e. salt water) to periodically regenerate the ion-exchange resins contained in the water-softening agent container 25. Salt water, in fact, is able to remove from the ion-exchange resins the calcium and magnesium ions previously combined/fixed to the resins.

The internal water softening device 18 may further preferably although not necessarily comprise: a water supply circuit 21a which is structured for channeling, on command, a given amount of fresh water into the regeneration-agent reservoir 25 so to at least partly dissolve the salt or other regeneration agents stored therein and form a given amount of brine (i.e. salt water); and an electrically-powered brine-circulating pump 26a which is interposed between the water-softening agent container 25 and the regeneration-agent reservoir 26 and is structured for transferring/moving the brine (i.e. the salt water) from the regeneration-agent reservoir 26 to the water-softening agent container 25 when activated.

Ion-removal internal water softening devices are disclosed, for example, in reference documents WO 2006 079 417 and/or EP 0 861 114 wherein an ion-removal internal water softening device comprised a flow through capacitor which comprises plates having a conductive surface. The plates are chargeable in response to an applied DC potential. The plates are separated from each other by non-conductive spacers. The plates and the conductive surface on the plates may be constructed from conductive materials such as metals, carbon or conductive polymers or combinations. Because the plates of the flow through capacitor have a limited capacity, the flow through capacitor requires regeneration, to remove the hardness ions from the flow through capacitor plates. The flow through capacitor may be regenerated by flushing with fresh water, short-circuiting the anode plates with the cathode plates or by reversing the polarity or by a combination thereof. The interval for regeneration is also dependent on the concentration of ions in the feed water; the harder the feed water, the more frequent regeneration is required. The water produced during regeneration contains a high level of hardness (ions) and is therefore directed to a waste outlet. The flow through capacitor thereby provides water softening without the addition of chemicals for regeneration.

It should in any case be understood that water softening device 18 is not limited only to ion-removal devices type, but according to other possible embodiments of the present invention, it may comprise any kind of device/apparatus operating according to known water softening technologies.

In accordance with an exemplary embodiment (not illustrated), the water softening device 18 may comprise: reverse osmosis systems/devices, nano-filtration systems/devices, distillation systems/devices such as membrane distillation systems/devices, boiling systems/devices, capacitive deionization systems/devices, electro-dialysis systems/devices and similar which are known and detailed description thereof will be omitted accordingly.

As illustrated in FIGS. 1, 2, 3, 5 and 7, the laundry washing machine 1 may further comprise a user control panel 28, which may be preferably, although not necessarily arranged in the front wall 2a of the casing 2 and is structured/configured to allow the user to input information being indicative of an time saving washing course to perform.

The user control panel 28 may preferably comprise, for example, a LED or LCD or fluorescent type display or the like, and/or preferably acoustic devices designed to generate vocal/acoustic messages.

As illustrated in FIG. 2, the laundry washing machine 1 comprise an electronic control unit 15 which may be electrically connected to the control panel 28 in order to receive the information inputted by the user, and is configured to provide a time saving value tSi associated with the washing duration of one or more wash phase/s of the selected washing course, and/or the duration of the course as a whole, based on the softened water laundry washing phase/s of the laundry washing course to be performed.

The present invention is described with reference to the time saving value tSi associated with the duration of the main wash phase. However other embodiments are contemplated wherein the time saving value tSi is associated with duration of the course as a whole, or the duration of a secondary wash phase and is calculated based on the softened water laundry washing phase/s of the laundry washing course to be performed. Preferably, time saving value tSi may be calculated based on the softened/mix/fresh water laundry washing phase/s of the laundry washing course to be performed.

The electronic control unit 15 may be further configured to control the actual duration preferably of the main wash phase during the execution of the wash course based on the determined time saving value tSi, so that the actual duration of the phase corresponds to the determined time saving value tSi.

In accordance with a first embodiment shown in FIG. 3, the control panel 28 may be structured/configured to allow the user to select a laundry washing course among one or more of preset time saving laundry washing courses, i.e. time saving cotton course, time saving synthetic course, time saving delicates wool course, or the like. Data relating to selectable/performable time saving laundry washing course/s may be preferably contained in a memory device 27 or any similar apparatus cooperating with the electronic control unit 15 and may comprise time saving value/s tSi associated with duration of the main wash phase, and/or duration of the whole course.

Memorized data relating to selectable/performable time saving washing course/s may further comprise information about the kind of water (softened/fresh/mix) and/or hardness degree of the water to be supplied during each laundry wash phase of a time saving washing course. For example, memorized data relating to a selectable time saving cotton course may comprise: time saving value tSi associated with the main wash phase and/or the time saving washing course, and/or information about the saved time $\Delta tSi$, information that the main wash phase is a softened water washing phase, information that the first rinse phase corresponds to a softened water washing phase, information that second rinse phase corresponds to a mix water washing phase, and information that final rinse phase corresponds to a fresh water washing phase.

It should be understood that saved time $\Delta tSi$ may be determined, for example, by calculating the difference between the time saving value tSi associated with the main wash phase and a time tNi, preferably a prefixed/nominal time, wherein the latter may correspond to duration required for performing preferably a main wash phase of a fresh water washing course having washing features similar to washing features of the time saving washing course.

FIG. 4 illustrates a table which contains on a column a number of time saving washing courses, (time saving washing course A, B, . . . , N) which could be implemented by means of the machine 1. For each time saving washing course, the table contains information relating to the optimized duration of the main wash phase (tS1, tS2, . . . , tSN), the respective saved time $\Delta tS1$, $\Delta tS2$, . . . , $\Delta tSN$, and the kind of water, i.e. softened, mix, fresh to be supplied during each laundry washing phase.

As shown in FIG. 4, time saving washing courses may be preferably configured so that: during the main wash phase, the softener system 14 is activated/controlled in the first operating state in order to provide/supply a softened water so as to perform a softened water washing phase, whereas during the secondary washing phase following the main wash phase, the softener system 14 is activated/controlled in order to selectively operate in the first or second or third state so as to provide softened, or fresh or mix water, respectively, in order to perform softened water washing phase, or fresh water washing phase or the mix water washing phase.

Preferably, one or more performable time saving washing courses may be programmed so that the first rinse phase is a softened water washing phase, whereas other performable time saving washing courses may be programmed so that the last rinse phase is a fresh water washing phase. Preferably, one performable time saving washing course may be programmed so that all the laundry wash phases, e.g. the main wash phase and secondary laundry wash phases, correspond to softened water wash phases.

Figure 5:
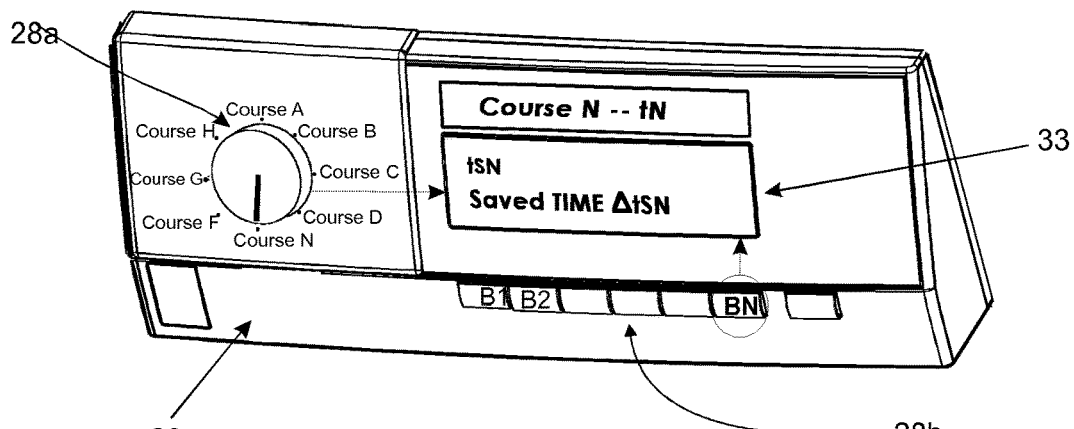
FIG. 5 schematically illustrates a second embodiment of a user control panel of the laundry washing machine illustrated in FIG. 1.

In accordance with a different embodiment shown in FIG. 5, the washing machine 1 may be provided with a control panel 28 structured/configured to allow the user to input first information indicative of a fresh water washing course to be performed, and second information indicative of one or more time saving command/s, and the electronic control unit 15 is configured to determine/set the time saving washing course based on received first and second information. The control panel 28 may be configured to allow operator to input said second information indicative of one or more time saving commands associated with respective time saving levels, whereas the electronic control unit 15 is configured to set/determine the time saving laundry washing course based on the selected fresh water laundry washing course and said time saving commands, and determine the time saving value tSi by reducing the time tNi on the basis on the time saving commands.

In accordance with the exemplary embodiment shown in FIG. 5, the control panel 28 may comprise a first select part 28a configured to allow the user to select a fresh water washing course among one or more of fresh water washing courses; and a second select part 28b is configured to allow the user to input one or more time saving commands corresponding to time saving states/levels that electronic control unit 15 may apply to the selected fresh water washing course.

The information associated with the fresh water washing courses selected by the first select part 28a may be contained in the form of data memorized in the memory device 27. According to this embodiment, memorized data associated to a fresh water washing course may preferably comprise information associated with the time tNi of the main wash phase associated with the selected fresh water washing course.

According to the embodiment illustrated in FIG. 5, the electronic control unit 15 may be configured to determine/set the time saving washing course to perform, based on the first information indicating the selected fresh water washing course and the second information relating to the selected time saving level that user has selected/requested. Preferably, the electronic control unit 15 may set/determine the time saving laundry washing course by changing/replacing/switching one or more fresh water washing phases of said selected fresh water laundry washing course, with one or more softened water laundry washing phases and/or mix water laundry washing phases, based on said time saving commands inputted by user.

In accordance with the second exemplary embodiment shown in FIG. 5, the electronic control unit 15 may be further configured to determine the time saving washing course to be performed by reducing the time tNi (associated to the fresh water washing course) to the time saving value tSi based on the kind of water (softened or mix or fresh) to be supplied during the washing phases and preferably provides the user, before starting the time saving course, with the time saving value tSi and/or with information associated with saved time ΔtSi, i.e. the time which may be saved (ΔtS=tNi−tSi).

In usage, during the time saving washing course, the electronic control unit 15 activates/controls the water softening system 14 (depending on the kind of softening system 14 presents on the machine 1) based on the set time saving washing course to cause softened water to be supplied during the main wash phase and/or one or more secondary wash phase/s, e.g. rinse phase/s of the fresh water washing course.

Applicant has performed washing tests to the scope of comparing the duration of the main wash phase of a "standard" fresh water laundry washing cycle in full load condition (8 Kg), in particular a customer Cotton 60°, 8 Kg of load, with different time saving courses in the same full load condition, according to aspects of the present invention. In detail, the standard" fresh water laundry washing cycle used in tests is characterized by supplying fresh water having an hardness degree of 25° FH during all wash phases, i.e. main and secondary phases, wherein the duration of the main wash phase is 105 minutes.

Applicant has found that by replacing the fresh water phases of the customer Cotton 60°, 8 Kg of load cited above, with respective softened water wash phases, wherein the softened water has hardness degree of 5° FH, the duration of the main wash phases may be reduced from 105 minutes to 80 minutes, maintaining conveniently the cleaning ratio obtained by the "standard" fresh water laundry washing course. Therefore time saving washing course allows to advantageously obtain a reduction of duration of about 24% compared with duration of a standard" fresh water main wash phase.

Applicant has further found that by replacing the fresh water phases of the customer Cotton 60°, 8 Kg of load cited above, with respective softened water wash phases, wherein the softened water has hardness degree of 1° FH, the duration of the main wash phases may be further reduced from 105 to 45 minutes, and cleaning ratio obtained by the "standard" fresh water laundry washing course is conveniently maintained. Therefore this time saving washing course allows to obtain a reduction of duration of about 57% compared with duration of a standard" fresh water main wash phase, without however causing the cleaning ratio to be reduced.

As shown in the example of FIG. 5, the first select part 28a may comprise a rotation knob for supplying the selected signal containing the first information after sensing whether a course is selected through rotation, whereas the second select part 28b may comprise one or more buttons B1, . . . , BN for supplying the selected signal containing the second information after sensing whether a time command/level has been selected. It should be in any case be understood that the first select part 28a and second select part 28b are not limited to the example illustrated in FIG. 5, but could comprise other kind of known input devices such as, for example, a touch panel's.

Figure 6:
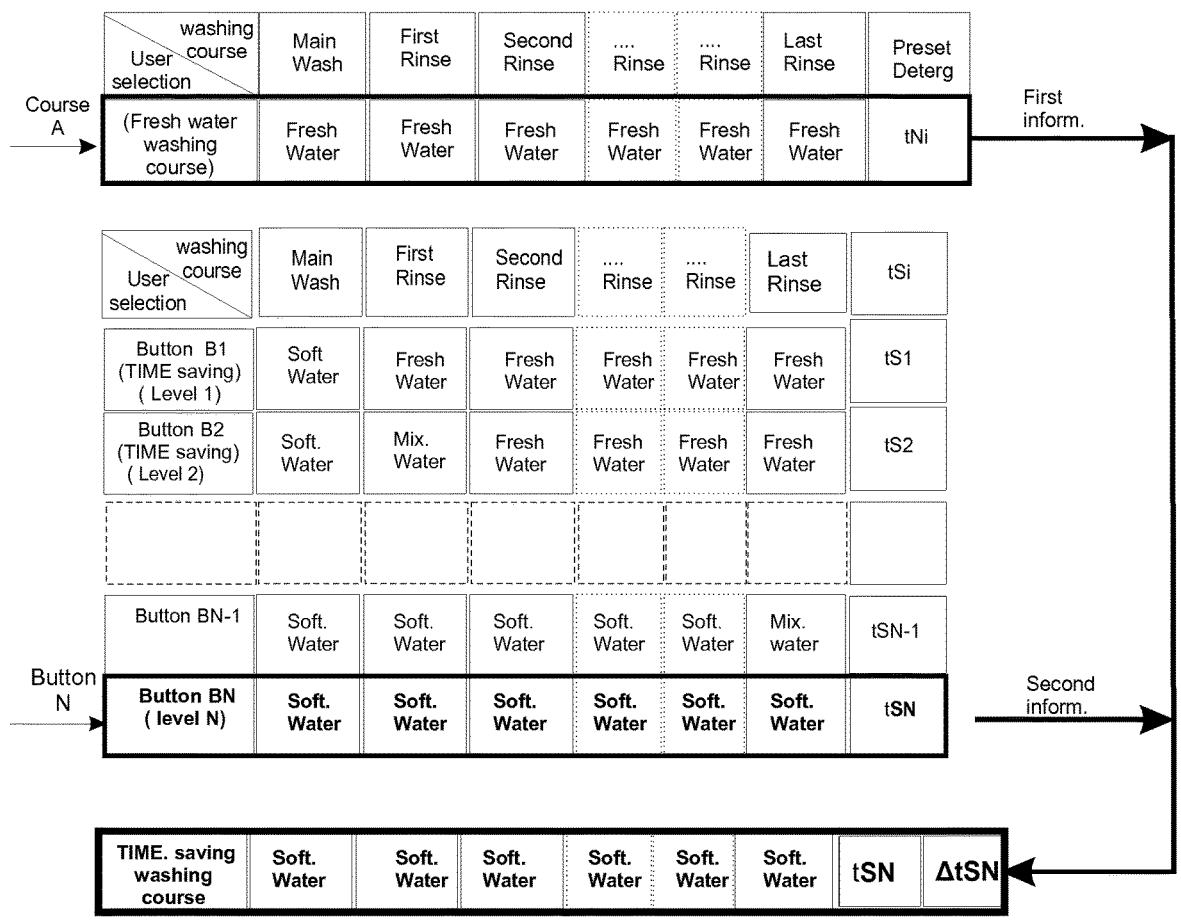
FIG. 6 shows an example of a table containing time saving washing courses selectable by the control panel illustrated in FIG. 5.

In the example shown in FIGS. 5 and 6, if the buttons B1, . . . , BN are not pushed, the electronic control unit 15 may set the "standard" fresh water washing course so as to load the fresh water during all the laundry washing phases and preferably display time tNi associated with the set standard" fresh water washing course.

When one or more buttons B1, . . . , BN is/are pushed, the electronic control unit 15 modifies the fresh water washing course in the "time saving washing course" by changing/switching/replacing the kind of water to be supplied during the washing phases. Kind of water (mix or soft or fresh) to be supplied during the washing phases, may be determined by the electronic control unit 15 on the basis of the pushed buttons B1, . . . , BN. For example, button B1 when pushed may cause the softened water to be supplied during the main wash phase and the predetermined duration tN1 to be reduced to the time saving value tS1; the button B2 when pushed may cause the softened water to be supplied during the first rinse, and the button BN, when pushed, may cause the softened water to be supplied during the last rinse.

It should be understood that the second select part 28b may be configured to allow the user to select the kind of water, i.e. fresh or softened or mix, to be supplied during the washing phases. For example, buttons B1, . . . , BN may be structured so that user may select the soft/fresh/mix based on a pushed time and/or number of repeatedly pushing of a same button. It should in any case be understood that buttons of the second select part 18b may be configured to cooperate with the electronic control unit 15 in order to allow the user to select any combination of loading of the softened water in the washing phases of the time saving washing course. For example, according to an embodiment the buttons may be configured so that pushing the button Bi may cause loading of the softened water during all laundry washing phases of washing course comprised between the main washing phase and the i-th washing phase. For example user may conveniently select a fresh water washing course to be performed, for example a cotton cycle, or delicate cycle, wool cycle, and pushes a button to select the time saving function in order to cause the selected fresh washing course to be performed as a time saving course.

Figure 7:
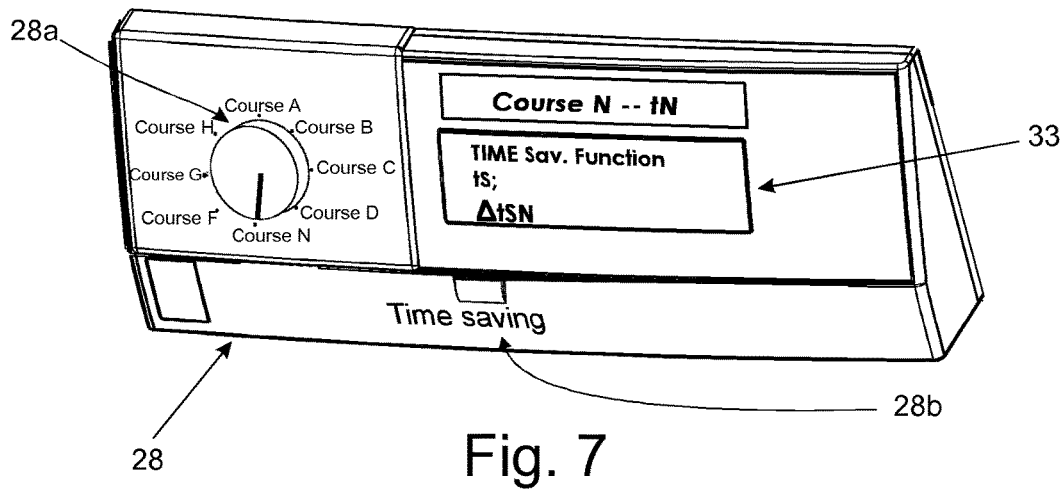
FIG. 7 schematically illustrates a third embodiment of a user control panel of the laundry washing machine illustrated in FIG. 1.
Figure 8:
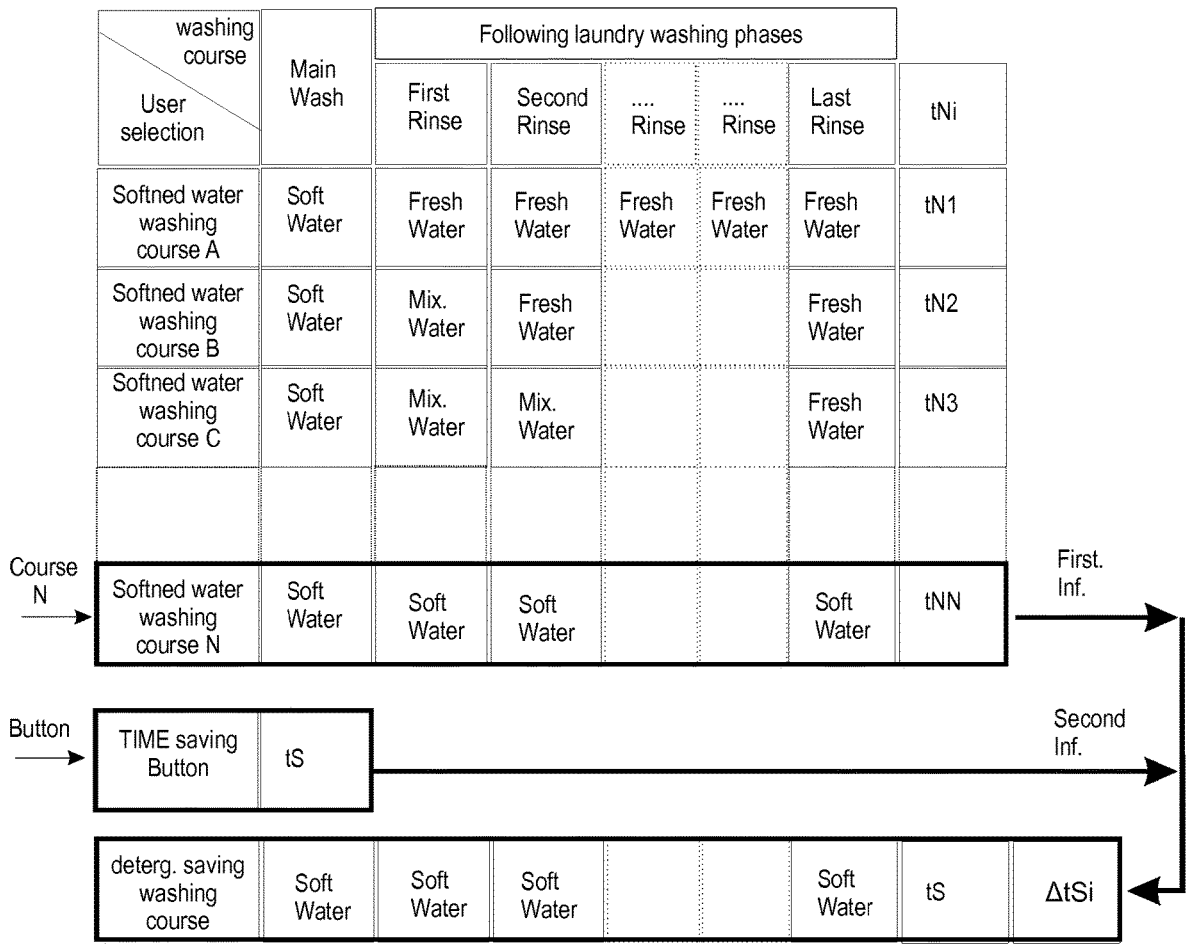
FIG. 8 shows an example of a table containing time saving washing courses selectable by the control panel illustrated in FIG. 7.

FIGS. 7 and 8 illustrate a third exemplary embodiment which differs from the second embodiment because the first select part 28a is configured to allow the user to select a laundry washing course among a plurality of "softened water washing courses" instead of "fresh water washing course", and the second select part 28b is configured to allow the user to select a time saving command/function.

Information about softened water washing courses may be contained in memory device 27 and comprise data relating to kind of water (softened, mix and fresh water) to be supplied during the washing phases, a value indicating a predetermined time tNi, i.e. a nominal duration, of the main wash phase, and the time saving value tSi having a value lower than the time tNi.

The electronic control unit 15 may be configured to set the time saving washing course based on the first information indicating the selected softened water washing course and the second information relating to the time saving command/function that user has requested, and determine the duration of the main wash phase based on the information inputted by the second select part 28b.

Preferably, the electronic control unit 15 may be configured to set a time saving washing course having, on the one hand, the same kind of the water during the washing phases and/or the same hardness degree as the softened water washing course, on the other hand, determine, and preferably display, the duration of the main wash phase/course which is reduced from the time tNi (associated to the softened water washing course) to time saving value tSi.

As shown in the example of FIGS. 3 and 7, the first select part 28a may comprise a rotation knob, whereas the second select part 28b may comprise at least one button for supplying the selected signal containing the second information, i.e. time saving command/function.

In the example shown in FIGS. 7 and 8, if the button is not pushed, the electronic control unit 15 may perform the softened water washing course selected by user, so as to load the softened water during the prefixed laundry washing phases, display the nominal duration tNi and, during the execution of the course, controls the main wash phase based on the nominal duration tNi.

On the contrary, when button is pushed, the electronic control unit 15 modifies the softened water washing course so as to define the "time saving washing course" to be performed, display the optimized duration tSi and, during the execution of the course, control the actual duration of the main wash phase based on the duration tSi. The electronic control unit 15 furthermore controls the water softening system 14 so as to supply softened water during the main wash phase, and selectively supply mix or softened or fresh water during the rinse phase/s following the main wash phase.

According to a preferred embodiment illustrated in the alleged figures, the electronic control unit 15 may be configured to provide the user via the control panel 28 and/or an indication of the difference ΔtSi between the time tNi and the time saving value tSi. The electronic control unit 15 may be further configured to provide the user via the control panel 28, i.e. by means of LED or LCD or fluorescent type display information associated with the saved time ΔtSi. For example, display may shows the time saved information in a numeric format or graphic format, i.e. histograms or icons or similar.

Figure 9:
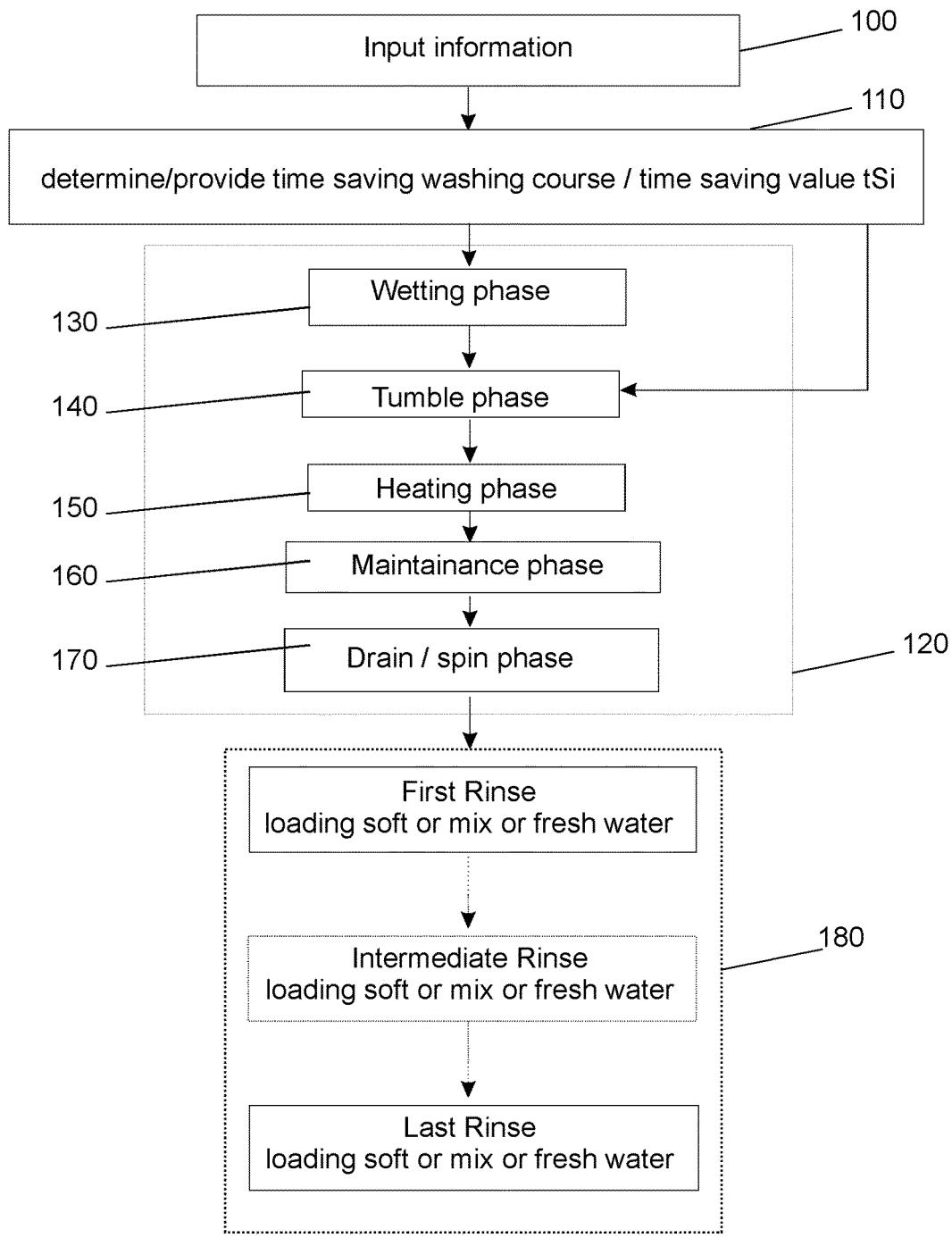
FIG. 9 is a flow chart containing the operation performed by the laundry washing machine of aspects of the present invention.

Next, the operation performed by laundry washing machine 1 according to aspects of the present invention will be explained in FIG. 9 which illustrates an outline operation flow chart.

In step 100, user inputs via the control panel 28 the information indicative of the time saving washing course to be performed. As above disclosed, in this step user could select directly the time saving washing course among a plurality of washing courses as illustrated in the example of FIGS. 1 and 3, or inputs the first and second information as illustrated in the second embodiment illustrated in FIG. 5 or the third embodiment illustrated in FIG. 7. The electronic control unit 15 determines in the memory device 27 all data/information about the kind of water (softened or mix or fresh water) and/or the prefixed hardness of the water to be supplied during each laundry washing phase, i.e. main wash phase and the rinse phases of the selected laundry washing course, based on the set time saving washing course.

After that, in step 110 the electronic control unit 15 determines the time saving value tSi based on the time saving washing course to be performed and preferably, although not necessarily provide the user with the information relating the time saving value tSi and/or saved time ΔtSi, before starting the course.

After that, in step 120, electronic control unit 15 may start performing the time saving washing course. Hereinafter, it will be supposed that user has selected a time saving washing course, wherein the main wash phase is performed by using softened water, and the secondary wash phases use softened water.

During the wetting step (step 130), the electronic control unit 15 activates/controls the softener system 14 so as to supply a softened water into the detergent dispensing system 12 to cause the detergent to be flushed from the detergent dispensing system 12 into the washing tub 3. At this time, the electronic control unit 15 may preferably although not necessarily control the valves 20, and/or 23a and/or 23b so as to selectively regulate flows/volumes of fresh water crossing the hosepipes 19, 21 and 22 and passing through the water softening agent container 25, based on the amount of softened water to be supplied and/or the hardness degree of the softened water. Preferably although not necessarily, if the laundry washing machine 1 comprises an electronic sensing system 32, the electronic control unit 15 may control the valves 20 and/or 23a and/or 23b based on a comparison between the prefixed hardness degree and the measured water hardness degree.

In one embodiment, main wash phase may comprise a drum tumbling step, wherein electronic control unit 15 controls the electric motor assembly 6 so as to rotate the drum 4 such that the laundry is tumbled/wetted and detergent is dissolved in the softened water loaded in the tub 3 (step 140). In this step, the electronic control unit 15 may further control the softener system 14 in order to supply softened water directly to the washing tub 3 until a prefixed water level is reached. In one embodiment electronic control unit 15 could control the flow diverter, if present, to supply softened water directly to the washing tub 3.

After the prefixed water level is reached, the electronic control unit 15 may continue to control the rotation of the drum 4 to perform the tumbling movements of the laundry inside of the drum 4 and preferably starts heating step wherein it controls the heating device 11 (step 150).

Next, in step 160, the electronic control unit 15 switches off the heating device 11 if the latter is on, and starts performing a maintenance step wherein the rotation of drum 4 is controlled in order to perform the tumbling movements of the laundry inside of the drum 4.

Next, in step 170, the main wash phase performs drain step and preferably, although not necessarily, the spin step. In the drain step, the electronic control unit 15 may preferably, although not necessarily, control the water draining system 8 to drain the washing water from the washing tub 3, whereas in the spin step the electronic control unit 15 controls the motor assembly 6 so as to spin the drum 4 at high speed one or more times.

The electronic control unit 15 controls the maintenance step, in such a way to cause the main wash phase to end within the determined time saving value tSi.

According to one exemplary embodiment, said determined time saving value tSi is associated with the duration of the maintenance step. In this case, the electronic control unit 15 controls rotation of drum 4 in such a way to cause the maintenance step to end within the determined time saving value tSi.

Preferably, if the main washing phase contains the heating step, i.e. a heated water washing course is performed, the duration of maintenance step is substantially the time comprised between the end of the heating step and the start of the drain step.

On the contrary, if the main washing phase does not contain the heating step, i.e. because a cold water washing course is performed, the duration of maintenance step may be the time comprised between the end of the wetting phase, and the start of the drain step of the main wash phase.

After completing/performing main wash phase, in step 180, the electronic control unit 15 may perform a prefixed number of rinse phases during which the electronic control unit 15 may activate/control the water softener system 14 in order to selectively supply softened, or mix, or fresh water to the washing tub 3 according to the selected time saving washing course. Therefore when it is required high level of time saving, the electronic control unit 15 may activate/control the softener system 14 to supply softened water in any rinse phase (Button BN/top level in the table illustrated in FIG. 4), whereas on the contrary, if a low level of time saving is required (level 1 in the table illustrated in FIG. 4), the electronic control unit 15 may control the softener system 14 to supply mix or fresh water during the rinse phases.

In accordance with one embodiment, rinse phases performed after the main wash phase may comprise the step to selectively supplying a soft or mix or fresh water to the washing tub 3 preferably, although not necessarily, through a main wash compartment (not illustrated) of the detergent dispensing assembly 12. The first rinse phase may also comprise a rinse maintenance step, wherein the electronic control unit 15 controls the motor assembly 6 in order to rotate the drum 4 so that the laundry is tumbled inside the drum 4, and a drain and spin step wherein the rinse water is removed from the laundry.

It has thus been shown that the present invention allows all the set objectives to be achieved.

While the present invention has been described with reference to the particular embodiments shown in the figures, it should be noted that the present invention is not limited to the specific embodiments illustrated and described herein; on the contrary, further variants of the embodiments described herein fall within the scope of the present invention, which is defined in the claims.

The invention claimed is:

1. A laundry washing machine comprising:
an outer casing,
a washing tub, which is arranged inside the outer casing,
a rotatable drum, which is arranged in an axially rotating manner inside the washing tub and is designed to receive laundry to be washed,
a detergent dispensing assembly, which is designed for supplying laundry detergent into the washing tub,
a water softening system, which is designed to receive fresh water from a water mains and reduce a hardness degree of the fresh water to supply softened water to the detergent dispensing assembly and/or to the washing tub, during one or more softened water laundry washing phases;
an electronic controller electronically connected to a control panel and configured to:
receive from an operator a selection of a laundry washing course to be performed from three or more selectable laundry washing courses, each of the three or more selectable laundry washing courses comprising a progressively increasing number of the one or more softened water laundry washing phases,
wherein each of the three or more selectable laundry washing courses has a respective time saving value (tSi) associated with a respective duration of each of the three or more selectable laundry washing courses, the respective time saving value (tSi) decreases indicating a decrease in the respective duration with the increasing number of the one or more softened water laundry washing phases included in each of the three or more selectable laundry washing courses,
determine the time saving value (tSi) of the selected laundry washing course to be performed,
determine a difference value (ΔtSi) between the time saving value (tSi) of the selected laundry washing course to be performed and a predetermined time value (tNi) associated with a predetermined laundry washing course having fresh water washing phases in place of the one or more softened water laundry washing phases,
display the determined difference value (ΔtSi) on the control panel, and
control the laundry washing machine to execute the selected laundry washing course.

2. The laundry washing machine according to claim 1, wherein said selected laundry washing course further comprises one or more fresh water laundry washing phases, wherein fresh water is supplied to the detergent dispensing assembly and to the washing tub;

said controller being configured to determine said time saving value (tSi) based on the one or more softened water laundry washing phases and the one or more fresh water laundry washing phases of the selected laundry washing course to be performed.

3. The laundry washing machine according to claim 1, wherein said selected laundry washing course further comprises one or more mix water laundry washing phases, wherein a mixture of fresh water and softened water is supplied to the detergent dispensing assembly and/or to the washing tub;

said controller being configured to determine said time saving value (tSi) based on the one or more softened water laundry washing phases and the one or more mix water laundry washing phases of the selected laundry washing course to be performed.

4. The laundry washing machine according to claim 2, wherein said controller is further configured to determine said time saving value (tSi) based on the one or more softened water laundry washing phases, one or more mix water laundry washing phases wherein a mixture of fresh water and softened water is supplied to the detergent dispensing assembly and/or to the washing tub, and the one or more fresh water laundry washing phases of the selected laundry washing course to be performed.

5. The laundry washing machine according to claim 1, wherein said selected laundry washing course comprises a main laundry wash phase and one or more secondary laundry wash phases following the main laundry wash phase, said main laundry wash phase comprises at least a wetting phase, a maintenance phase and a drain phase, and said one or more secondary laundry wash phases comprising one or more rinse phases which start after the end of said drain phase of the main laundry wash phase.

6. The laundry washing machine according to claim 1, comprising memory means containing data relating to the three or more selectable laundry washing courses, said data being indicative of loading of softened water, or fresh water, or mix water to the detergent dispensing assembly and/or the washing tub during the laundry washing phases, and being associated with the time saving value (tSi), wherein said controller is configured to selectively activate said water softening system based on said selected laundry washing course in order to supply softened water to the detergent dispensing assembly and/or the washing tub during at least a main laundry wash phase.

7. The laundry washing machine according to claim 1, wherein the softened water has a reduced hardness degree which is lower than 15 FH.

8. The laundry washing machine according to claim 1, wherein the softened water has a reduced hardness degree which is lower than, or equal to 5 FH.

9. The laundry washing machine according to claim 1, wherein the softened water has a reduced hardness degree which is lower than, or equal to 2 FH.

10. The laundry washing machine according to claim 1, wherein the softened water has a reduced hardness degree which is lower than, or equal to 1 FH.

11. The laundry washing machine according to claim 3, wherein the mixture of fresh water and softened water has a reduced hardness degree which is greater than, or equal to 15 FH, and lower than, or equal to 25 FH.

12. The laundry washing machine according to claim 5, wherein said main laundry wash phase comprises the one or more of the softened water laundry wash phases, and each secondary laundry wash phase comprises a softened water laundry wash phase or a fresh water laundry wash phase or a mix water laundry wash phase.

13. The laundry washing machine according to claim 1, wherein said water softening system comprises a water-softening agent container, which is filled with a given amount of ion-exchange resins capable to restrain calcium and/or magnesium ions dissolved in the fresh water flowing across the water-softening agent container, and a regeneration-agent reservoir which is structured for receiving a given amount of salt grains and is designed to use brine to periodically regenerate said ion-exchange resins contained in said water-softening agent container.

14. The laundry washing machine according to claim 1, wherein the water softening system comprises at least a flow through capacitor.

15. The laundry washing machine according to claim 5, wherein said controller is configured to control the maintenance phase in such a way to cause the main wash phase to end within said time saving value (tSi).

16. The laundry washing machine according to claim 1, comprising: electronic sensing means configured to determine the hardness degree of the water supplied into the washing tub;

said controller being configured to regulate the time saving value (tSi) based on said determined hardness degree.

17. The laundry washing machine according to claim 16, wherein said controller is configured to control said water softening system in order to regulate the hardness degree of the softened water based on the determined hardness degree.

* * * * *